(12) United States Patent
Seo (10) Patent No.: US 10,700,559 B2
(45) Date of Patent: Jun. 30, 2020

(54) STATOR CORE, A STATOR AND A MOTOR

(71) Applicant: LG INNOTEK CO., LTD., Seoul (KR)

(72) Inventor: Ja Young Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/250,066

(22) Filed: Jan. 17, 2019

(65) Prior Publication Data

US 2019/0148996 A1 May 16, 2019

Related U.S. Application Data

(63) Continuation of application No. 15/092,046, filed on Apr. 6, 2016, now Pat. No. 10,224,765.

(30) Foreign Application Priority Data

Apr. 7, 2015 (KR) .................. 10-2015-0049105

(51) Int. Cl.
*H02K 1/14* (2006.01)

(52) U.S. Cl.
CPC ............. *H02K 1/14* (2013.01); *H02K 1/148* (2013.01); *H02K 2213/03* (2013.01)

(58) Field of Classification Search
CPC ............ H02K 1/14; H02K 1/148; H02K 1/20
USPC ................... 310/216.001–216.137
See application file for complete search history.

(56) References Cited

U.S. PATENT DOCUMENTS

| 7,164,218 B2 | 1/2007 | Kimura |
| 2004/0119367 A1 | 6/2004 | Hiwaki |
| 2005/0212378 A1 | 9/2005 | Wang |
| 2006/0125341 A1 | 6/2006 | Rau |
| 2009/0100861 A1 | 4/2009 | Higuchi |
| 2009/0289522 A1 | 11/2009 | Buban |
| 2010/0135830 A1 | 6/2010 | Yasuda |
| 2013/0033132 A1 | 2/2013 | Jayasoma |
| 2014/0167558 A1 | 6/2014 | Woo |

FOREIGN PATENT DOCUMENTS

| CN | 1508939 | 6/2004 |
| CN | 103872809 | 6/2014 |
| DE | 10 2012 215 232 | 3/2014 |
| DE | 10 2013 201 320 | 7/2014 |
| JP | 53133702 | 11/1978 |
| JP | 2006-121818 | 5/2006 |

(Continued)

OTHER PUBLICATIONS

Machine Translation, Shimizu, JP-2006121818-A, May 2006. (Year: 2006).*

(Continued)

*Primary Examiner* — Thomas Truong
(74) *Attorney, Agent, or Firm* — KED & Associates LLP (57) ABSTRACT

A stator core, a stator and a motor are provided. The stator core may include a head that extends in a circumferential direction; a tooth that extends inward from the head; a first protruding portion that extends outward from an outer circumferential surface of the head; and a second protruding portion that protrudes from an outer circumferential surface of the first protruding portion.

20 Claims, 6 Drawing Sheets

(56) References Cited

FOREIGN PATENT DOCUMENTS

| | | | |
|---|---|---|---|
| JP | 2006121818 A | * | 5/2006 |
| JP | 2006-333657 | | 12/2006 |
| KR | 10-2015-0042379 | | 4/2015 |
| KR | 10-2019-0008400 | | 1/2019 |

OTHER PUBLICATIONS

Chinese Office Action dated Mar. 27, 2019 issued in Application 201610206272.6.
European Search Report dated Aug. 17, 2016 issued in Application No. 16164178.2.
Korean Office Action dated Jul. 5, 2018 issued in KR Application No. 10-2015-0049105.
U.S. Office Action dated Mar. 9, 2017 issued in parent U.S. Appl. No. 15/092,046.
Final U.S. Office Action dated Jul. 19, 2017 issued in parent U.S. Appl. No. 15/092,046.
U.S. Office Action dated Jul. 5, 2018 issued in parent U.S. Appl. No. 15/092,046.
"Integral, adj. and n." OED Online, Oxford University Press, Dec. 2016. Web. Mar. 2, 2017.
Machine Translation, Kesel et al., DE 102012215232 A1, Mar. 6, 2014.
Machine Translation, Lambert et al., DE 102013201320 A1, Jul. 31, 2014.
USPTO Translation, Noguchi, JP 53133702 A Nov. 1978.
Korean Office Action dated Nov. 8, 2019 issued in Application 10-2019-0121983

* cited by examiner

STATOR CORE, A STATOR AND A MOTOR

CROSS-REFERENCE TO RELATED APPLICATIONS

This application is a Continuation Application of U.S. patent application Ser. No. 15/092,046 filed Apr. 6, 2016, which claims priority under 35 U.S.C. § 119 to Korean Application No. 10-2015-0049105 filed on Apr. 7, 2015, whose entire disclosures are hereby incorporated by reference.

BACKGROUND

1. Field

Embodiments relate to a stator core, a stator and a motor.

2. Background

An EPS (Electronic Power Steering) system may be used in order to secure steering stability of a vehicle. In the EPS system, an ECU (Electronic Control Unit) may drive a motor depending on driving conditions detected by sensors, such as, e.g., a speed sensor, a torque angle sensor, and a torque sensor. The EPS system may secure turning stability and rapid stability restoring force so that a driver may drive a vehicle safely.

In the EPS system, a motor assists in a torque of a steering wheel so that the driver may operate the steering wheel with less physical power. The motor may be a BLDC (Brushless Direct Current) motor. Principal components of the BLDC motor include a stator and a rotor. A coil is wound on the stator, and a magnet is coupled to the rotor so that the rotor may rotate via a mutual electromagnetic interaction. In the EPS motor, performance of the motor depends on how a friction torque, or a mechanical or frictional component generated during rotation of the motor, may be reduced.

BRIEF DESCRIPTION OF DRAWINGS

The embodiments will be described in detail with reference to the following drawings in which like reference numerals refer to like elements wherein.

DETAILED DESCRIPTION

Figure 1:
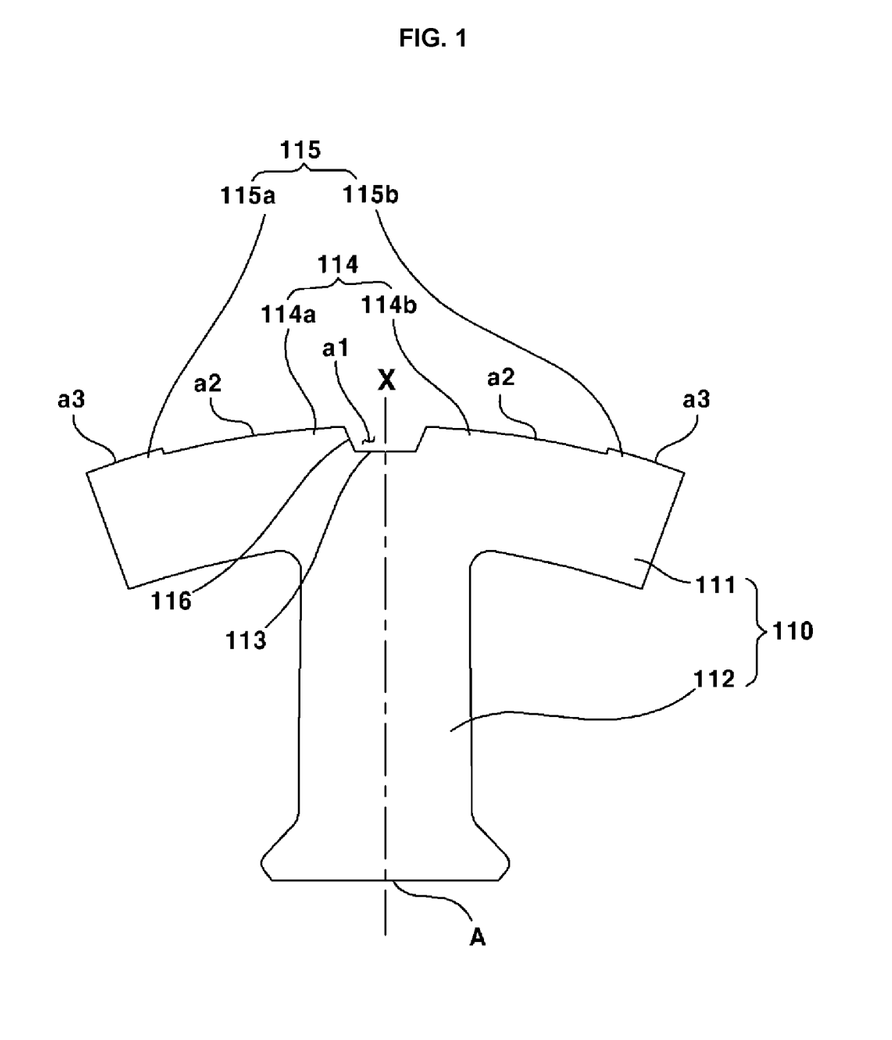
FIG. 1 is a plan view illustrating a stator core according to an embodiment.
Figure 2:
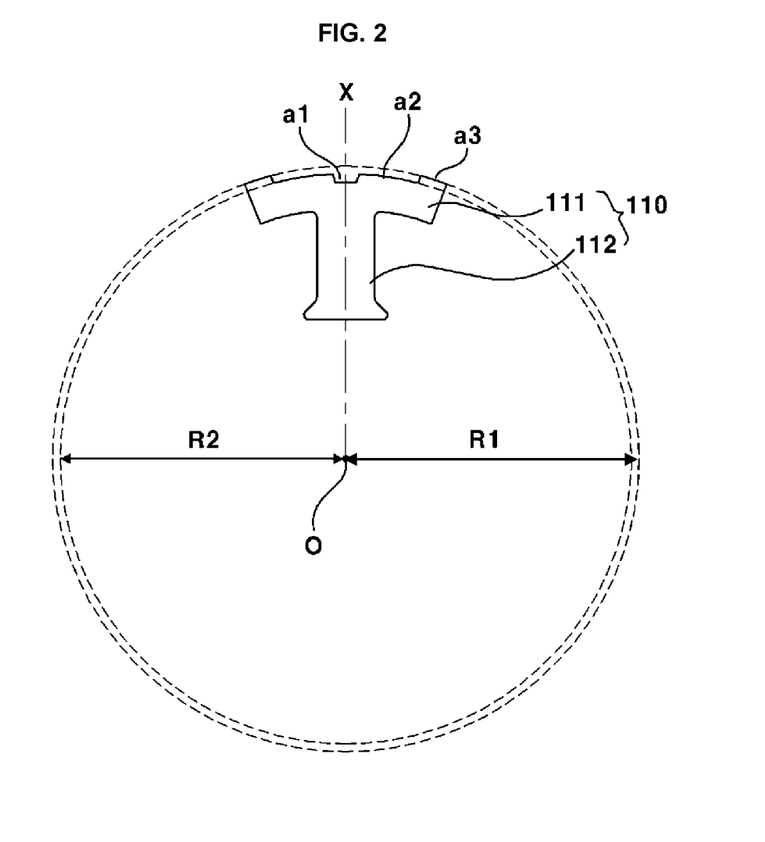
FIG. 2 is a conceptual view of a structure of FIG. 1.
Figure 3:
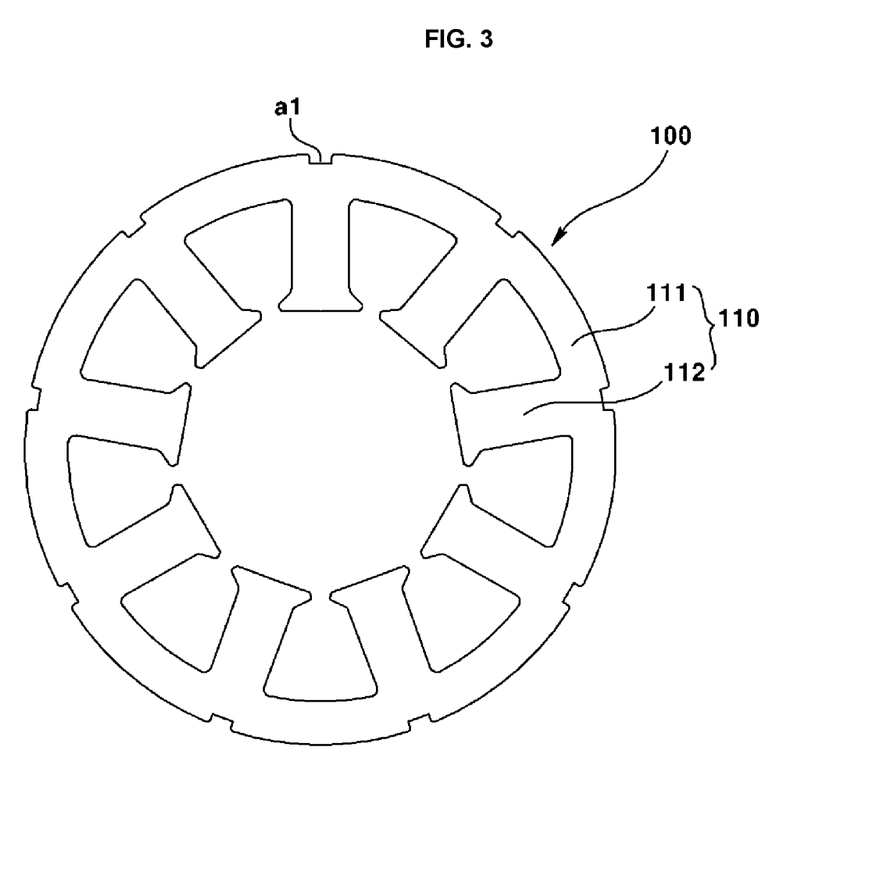
FIG. 3 is a plan view illustrating a stator according to an embodiment.

Referring to FIGS. 1 to 3, a stator 100 according to an embodiment may include a plurality of stator cores 110 having a tooth 112 protruded from a head part 111. The stator 100 may be formed by coupling the plurality of stator cores 110. The plurality of stator cores 110 may be adjacent to one another and may be coupled such that an outer circumferential surface of the head parts 111 form a circular shape. At least two stepped areas a2, a3 may be provided at the head part 111 of the stator core 110, and a straight distance of the respective stepped areas a2, a3, from an inner end of the tooth 112 to an outer circumferential surface of the head part 111, is different from each other.

As illustrated in FIG. 1, the stepped area a2, a3 may be defined as an area each having a different straight distance measured from an inner end (A) to an outer circumferential surface of the head part 111 including a curved surface having a predetermined curvature. Each of the stepped areas a2, a3 may form an area of a structure having a predetermined curvature surface. The area may contact a surface of the motor housing and may be located higher than another area of the at least two stepped areas. The other area of the at least two stepped areas, which may be lower, may form a separated area spaced apart from the motor housing so as to reduce a frictional area. Two of the stepped areas may be provided at the head part of the stator core. However, the embodiment is not limited thereto, and a greater number of stepped areas may be implemented at the stator core.

As illustrated in FIG. 1, the stepped area a2, a3 may include a first stepped area a2 having a bidirectional first curvature surface at a center line (X), and a second stepped area a3 extended from a distal end of the first stepped area a2 and having a second curvature surface of which the straight distance may be longer than that of the first stepped area a2. Although a height of the second stepped area a3 as shown in the figures is higher than that of the first stepped area a2, conversely, the first stepped area a2 may have a height (straight distance) higher than that of the second stepped area a3.

A stepped groove a1 formed in a direction towards the tooth 112 may be additionally provided at a position where the center line (X) encounters the outer circumferential surface of the head part 111. The stepped groove a1 may have a depth deeper than that of the first stepped area a2. Although not illustrated in the figures, a friction reducing pattern including a plurality of inwardly recessed grooves having a structure similar to that of the stepped groove a1 may be provided at at least one of an outer circumferential surface of the first stepped area a2 and an outer circumferential surface of the second stepped area a3. Thus, frictional index of the surfaces may be further reduced.

As illustrated in FIG. 2, the stator core 110 having a structure as illustrated in FIG. 1 may have a structure where a radius (R2) of a virtual circle is different from a radius (R1) of a virtual circle. The radius (R2) may be a radius of a virtual circle where the curvature surface of the first stepped area a2 extends, and the radius (R1) refers to a radius of a virtual circle where the curvature surface of the second stepped area a3 extends.

If a plurality of the stator cores 110 is combined to form the stator 100 as illustrated in FIG. 3, an outer circumferential surface of the stator 100 may correspond to the virtual circle having the radius (R1) as illustrated in FIG. 2. For example, the second stepped areas a3 of adjacently arranged stator cores 110 may all have equal height and curvature such that height deviation may be eliminated in a combined structure of the plurality of the stator cores 110. Thus, friction with an external housing may be reduced.

Figure 4:
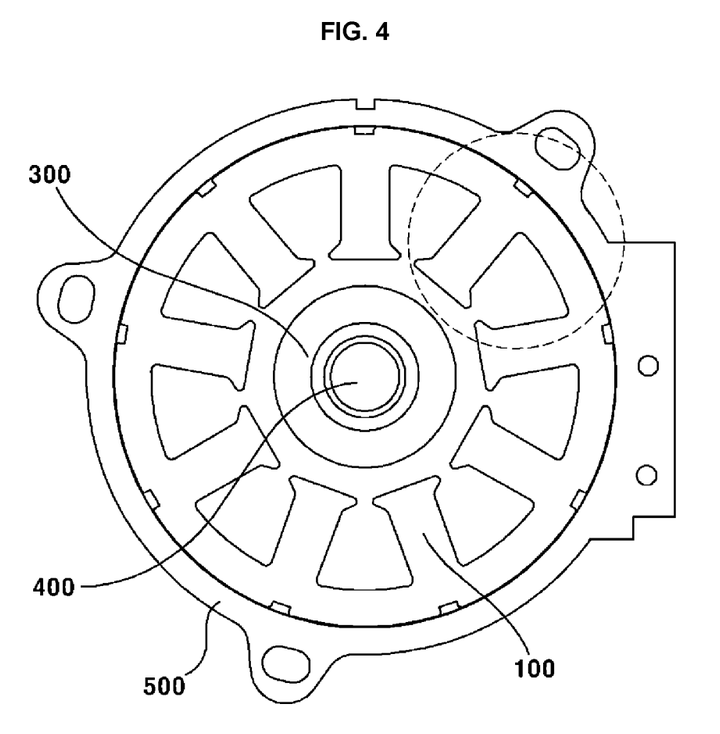
FIG. 4 is a plan view illustrating a partial structure of a motor according to an embodiment.
Figure 5:
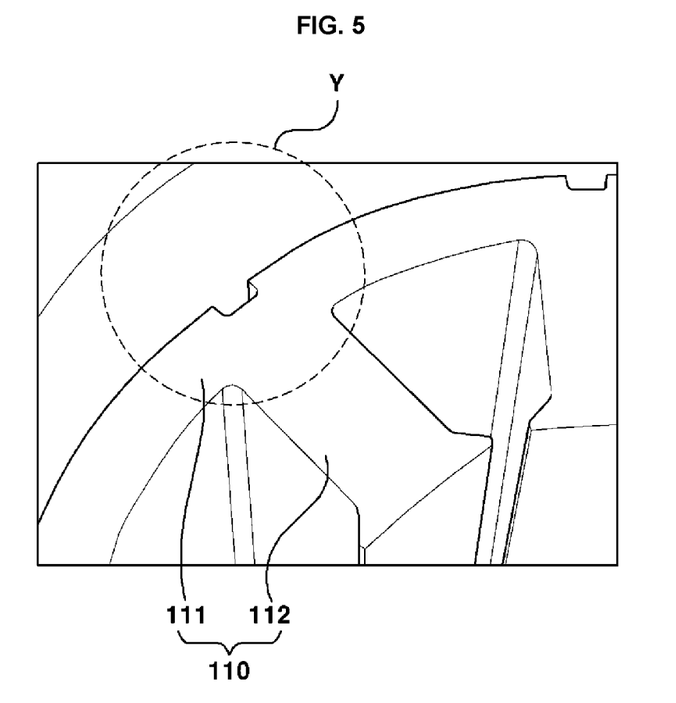
FIG. 5 is an enlarged perspective view illustrating a portion of a motor according to an embodiment.

As illustrated in FIGS. 4 and 5, if a contact area (Y) between the stepped areas a2, a3 and an inner surface of a housing 500 of a motor is enlarged, a separated portion between the first stepped area a2 and an inner surface of the housing 500 of the motor may be shown to be provided at the head part 111 of the stator core 110. The separated portion may reduce a contact area between the stator 100 and the housing 500 of the motor such that friction may be reduced on the whole.

TABLE 1 shows results of friction torque of an embodiment having the stepped areas a2, a3 and a comparative embodiment, under a condition that a stator core of a same standard is provided. In this embodiment, the first stepped area a2 formed a 5 mm section in left and right directions on the basis of the center line (X), and 30 rpm of driving power was applied in the experiment.

TABLE 1

| | Friction Torque (30 rpm) | | | |
|---|---|---|---|---|
| | Comparative Embodiment | | Exemplary Embodiment | |
| | CW | CCW | CW | CCW |
| #Sample 1 | 16.88 | 16.59 | 12.97 | 12.69 |
| #Sample 2 | 17.57 | 17.13 | 13.66 | 13.09 |
| #Sample 3 | 16.41 | 16.25 | 13.27 | 12.58 |
| AVERAGE | 16.95 | 16.66 | 13.30 | 12.79 |

Figure 6:
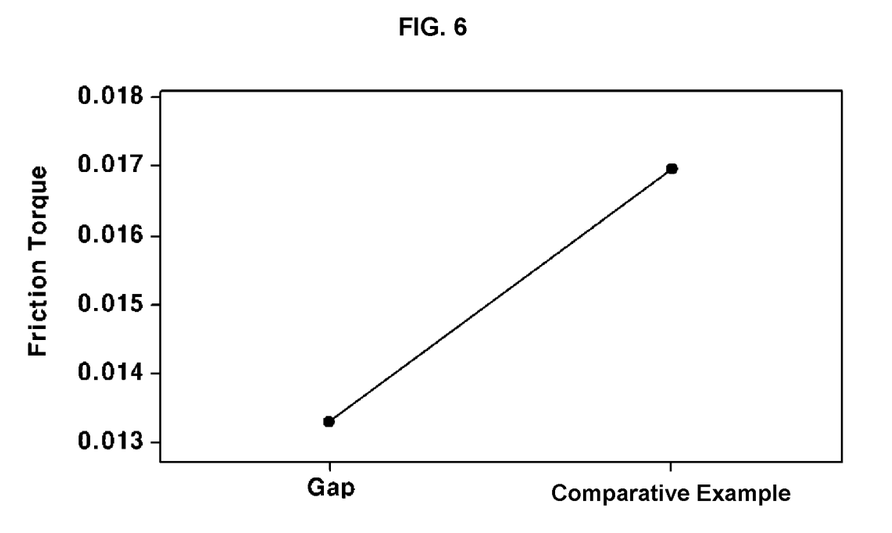
FIG. 6 is a graph illustrating a result of an experiment for reducing friction according to an embodiment.

As shown in TABLE 1, friction torque may be reduced by approximately a maximum of 25% when a stator core includes the stepped areas a2, a3 as compared to the comparative embodiment. Similar results may also be shown in the graph of FIG. 6, where friction torque is significantly reduced in an embodiment with a stepped area (Gap) according to the present disclosure in comparison with a comparative embodiment.

Figure 7:
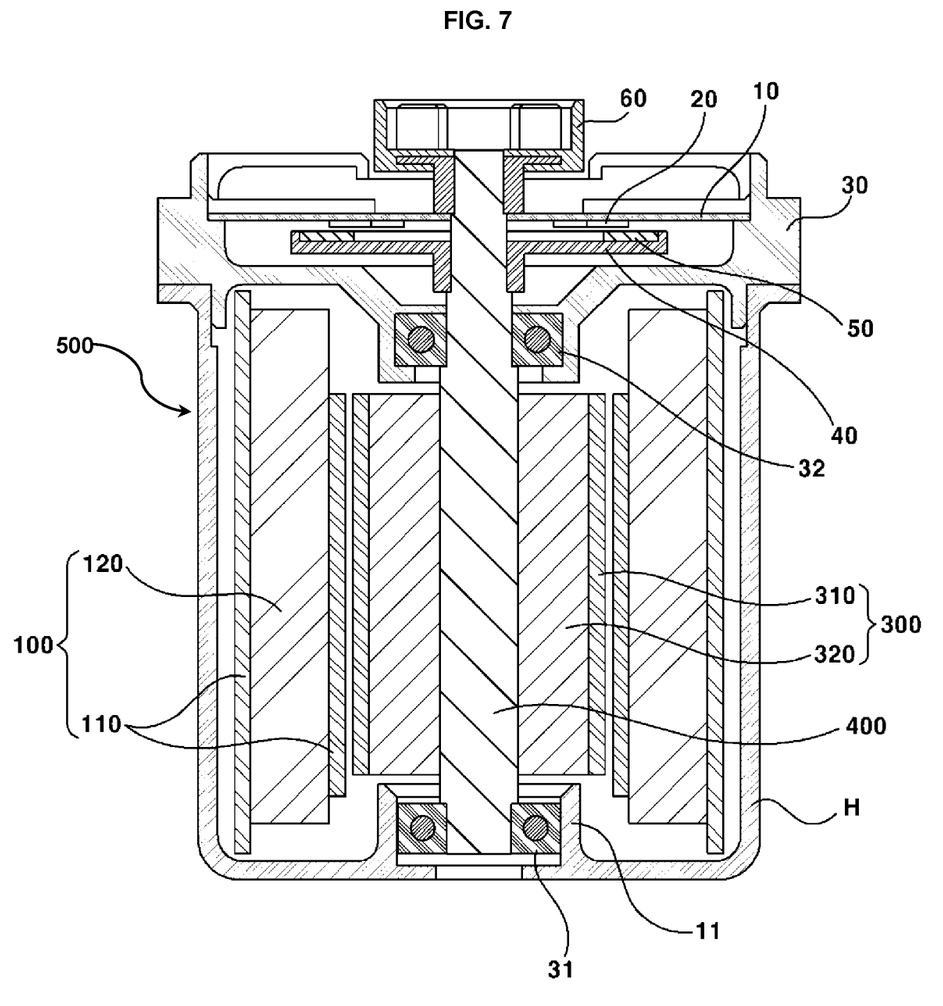
FIG. 7 is a sectional view illustrating a motor according to an embodiment.

Hereinafter, an example of an EPS (Electronic Power Steering) motor employing the stator core 110 according to an embodiment of the present disclosure may be described. However, the stator core 110 may be applied to various types of motors. Referring to FIG. 7, a motor housing 500 and a bracket 30 coupled to the housing 500 may be provided. An upper surface of the housing 500 may be opened, and a support pipe 11 may be protruded from a center of a lower surface of the housing 500. A first bearing 31 may be installed at the support pipe 11, and a second bearing 32 may be installed at the bracket 30. A shaft 400 may contact and support the first bearing 31 and the second bearing 32. An upper portion of the shaft 400 may be supported by the second bearing 32, and a lower portion of the shaft 400 may be supported by the first bearing 31.

An upper end of the shaft 400 may be upwardly protruded and penetrate through the bracket 30, and may be combined with instruments 60 connected to a steering shaft. A stator 100 and a rotor 300 may be installed inside of the housing 500. The rotor 300 may include a rotor core 320 coupled to the shaft 400, and a magnet 310 coupled to an outer circumferential surface of the rotor core 320. Although a structure where the magnet 310 is coupled to an outer circumferential surface of the rotor core 320 is shown in FIG. 7, another structure where the magnet 310 is inserted in the rotor core 320 may also be applied. The stator 100 may include a stator core 110 arranged between the magnet 310 and the housing 110, and a coil 120 wound on the stator core 110.

The stepped areas a2, a3 as previously described in FIGS. 1 to 5 may be applied to the stator core 110 composing the stator 100. The shaft 400 may rotate by interaction between a magnetic field generated from the stator 100 and a magnetic field generated from the rotor 300. A sensing plate 40 may be coupled to the shaft 400 to rotate with the shaft 400, and a sensing magnet 50 may be installed at the sensing plate 40. A circuit board 10 may be installed at the bracket 30, and a sensing element or sensor 20 facing the sensing magnet 50 may be installed at the circuit board 10. The sensing element 20 may sense an extent of rotation of the sensing magnet 50 so as to sense rotation of the sensing plate 40 coupled with the sensing magnet 50 and the shaft 400.

According to embodiments disclosed herein, the stator core 110 may include a head part 111, a tooth 112, a first protruding part or portion 114, and a second protruding part or portion 115. The stator core 110 may include a head part 111 extended in a circumferential direction. The stator core 110 may include a tooth 112 inwardly extended from the head part 111. The stator core 110 may include a first protruding part 114 outwardly protruded from an outer circumferential surface 113 of the head part 111. The stator core 110 may include a second protruding part 115 outwardly protruded from an outer circumferential surface of the first protruding part 114.

The first protruding part 114 may include a first protrusion 114a and a second protrusion 114b. The first protruding part 114 may include a first protrusion 114a provided in a first direction of a circumferential direction from the outer circumferential surface 113 of the head part 111; and a second protrusion 114b provided in a second direction opposite to the first direction from the outer circumferential surface 113 of the head part 111. The first protrusion 114a and the second protrusion 114b may be symmetrical around a center of the head part 111. A length of the first protrusion 114a in the circumferential direction may be longer than a length of the outer circumferential surface 113 of the head part 111 in the circumferential direction. The first protruding part 114 may include an inclined part 116 inclinedly connecting an outer circumferential surface 113 of the head part 111 and an outer circumferential surface of the first protruding part 114.

The second protruding part 115 may include a third protrusion 115a and a fourth protrusion 115b. The second protruding part 115 may include a third protrusion 115a provided in the first direction from the first protrusion 114a; and a fourth protrusion 115b provided in the second direction from the second protrusion 114b. The third protrusion 115a and the fourth protrusion 114b may be symmetrical around a center of the head part 111. A length of the third protrusion 115a in the circumferential direction may be longer than a length of the first protrusion 114a in the circumferential direction and shorter than a length of the outer circumferential surface 113 of the head part 111 in the circumferential direction. A length of the first protruding part 114 outwardly protruded from the outer circumferential surface 113 of the head part 111 may be longer than a length of the second protruding part 115 outwardly protruded from the outer circumferential surface of the first protruding part 114.

A friction reducing pattern including a plurality of inwardly recessed grooves may be formed at least one of the outer circumferential surface 113 of the head part 111 and the outer circumferential surface of the first protruding part 114.

The stator 100 may be formed by a structure where a plurality of the stator cores 110 is arranged in a circumferential direction. The plurality of the stator cores 110 may be integrally formed. The motor according to embodiments disclosed herein may include the stator 100, and the housing 500 internally accommodating the stator 100. An outer circumferential surface of the second protruding part 115 may contact with an inner circumferential surface of the housing 500.

An external diameter of approximately 5 mm sections at both sides of the stator may be reduced such that an area contacting the housing 500 may be reduced to form an air gap. For example, a plurality of the stator cores 110 may be indented and assembled with the housing 500, such that eighteen sections contact the housing 500 and remaining sections form air gaps to reduce friction torque. The air gaps between the housing 500 and the stator 100 are formed or provided to reduce friction torque.

In order to reduce friction torque of the motor as described above, at least two stepped areas may be provided, where the stepped areas are different from each other in height. Thus, frictional torque may be reduced by reducing a frictional index when a stator is installed in the housing.

Embodiments disclosed herein provide a plurality of stator cores, the stator core including a tooth protruded from a head part or head, wherein the plurality of stator cores may be adjacent to one another and coupled such that an outer circumferential surface of the head part may form a circular shape, wherein at least two stepped areas may be provided on the head part. A straight direction, from one end of the tooth to the outer circumferential surface of the head part, of the respective stepped area may be different from each other.

Embodiments disclosed herein also provide a motor, the motor including a motor housing; a stator including the plurality of stator cores, each including a tooth protruded from a head part or head; and a rotor rotatably installed at a center of the stator, and including a through-hole formed at a center and a magnet module, wherein at least two stepped areas may be provided at the head part of the stator core, where a straight distance of the respective stepped areas, from one end of the tooth to an outer circumferential surface of the head part, may be different from each other, and wherein any one of the at least two stepped areas may contact an inner circumferential surface of the motor housing.

The stator core may include a head part extended in a circumferential direction; a tooth inwardly extended from the head part; a first protruding part or portion outwardly protruded from an outer circumferential surface of the head part; and a second protruding part or portion outwardly protruded from an outer circumferential surface of the first protruding part. The first protruding part may include a first protrusion provided in a first direction of the circumferential direction from the outer circumferential surface of the head part; and a second protrusion provided in a second direction opposite to the first direction from the outer circumferential surface of the head part.

The first protrusion and the second protrusion may be symmetrical about or around a center of the head part. A length of the first protrusion in the circumferential direction may be longer than a length of the outer circumferential surface of the head part in the circumferential direction. The first protruding part may include an inclined part or portion inclinedly connecting an outer circumferential surface of the head part and an outer circumferential surface of the first protruding part. The second protruding part may include a third protrusion provided in the first direction from the first protrusion; and a fourth protrusion provided in the second direction from the second protrusion.

The third protrusion and the fourth protrusion may be symmetrical about or around a center of the head part. A length of the third protrusion in the circumferential direction may be longer than a length of the first protrusion in the circumferential direction, and shorter than a length of the outer circumferential surface of the head part in the circumferential direction. A length of the first protruding part outwardly protruded from the outer circumferential surface of the head part may be longer than a length of the second protruding part outwardly protruded from the outer circumferential surface of the first protruding part. A friction reducing pattern including a plurality of inwardly recessed grooves may be formed at least one of the outer circumferential surface of the head part and the outer circumferential surface of the first protruding part.

The stator may include a first stator core and a second stator core couple to the first stator core in a circumferential direction, wherein the first stator core includes a head part or head extended in a circumferential direction; a tooth inwardly extended from the head part; a first protruding part or portion outwardly protruded from an outer circumferential surface of the head part; and a second protruding part or portion outwardly protruded from an outer circumferential surface of the first protruding part. The first stator core and the second stator core may be integrally formed.

The motor may include a stator core including a head part or head extended in a circumferential direction, a tooth inwardly extended from the head part, a first protruding part or portion outwardly protruded from an outer circumferential surface of the head part, and a second protruding part or portion outwardly protruded from an outer circumferential surface of the first protruding part; and a housing internally accommodating the stator core, wherein an outer circumferential surface of the second protruding part has an inner contact with an inner circumferential surface of the housing.

The terms including ordinal numbers such as "first" or "second" may be used for description of various elements. However, the elements shall not be limited by such the terms. The terms are used merely to distinguish a particular element from another element.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor, comprising:
 a housing;
 a stator disposed in the housing; and
 a rotor disposed in the stator and including a central axis,
  wherein the stator includes a plurality of divided cores, at least one of the plurality of divided cores including a head and a tooth extending from the head,
  wherein the head includes a first outer circumferential surface having a first shortest distance from the central axis and a second outer circumferential surface having a second shortest distance from the central axis, the second outer circumferential surface extending from a first end of the second outer circumferential surface to a second end of the second outer circumferential surface, wherein the first shortest distance is smaller than the second shortest distance, wherein the first outer circumferential surface includes a first groove, and wherein the second outer circumferential surface includes a second groove spaced apart from the first groove, the second groove provided on the second outer circumferential surface between the first end and the second end, the second outer circumferential surface is in contact with the housing at a first area of the second outer circumferential surface between the first end and the second groove, and is in contact with the housing at a second area of the second outer circumferential surface between the second groove and the second end.

2. The motor of claim 1, wherein the first outer circumferential surface is spaced from the housing.

3. The motor of claim 2, wherein the first outer circumferential surface and the second outer circumferential surface include a curved surface shape disposed on a concentric circle having the central axis as a center.

4. The motor of claim 3, wherein a curvature of the second outer circumferential surface is the same as a curvature of an inner circumferential surface of the housing.

5. The motor of claim 1, wherein the first groove and the second groove extend axially from an upper end to a lower end of the stator.

6. The motor of claim 5, wherein the first outer circumferential surface is disposed in a center of the head in a circumferential direction.

7. The motor of claim 6, wherein the first groove is disposed in a center of the head in a circumferential direction.

8. The motor of claim 1, wherein the second outer circumferential surface are provided in plural, and the second outer circumferential surfaces are respectively disposed on both sides of the first outer circumferential surface.

9. The motor of claim 8, wherein the second groove is formed in one of a plurality of second outer circumferential surfaces.

10. The motor of claim 1, wherein a diameter of a virtual circle formed by connecting the first outer circumferential surfaces is different from a diameter of a virtual circle formed by connecting the second outer circumferential surfaces.

11. The motor of claim 10, wherein a circumferential length of the first outer circumferential surface is longer than a circumferential length of the second circumferential surface.

12. The motor of claim 1, wherein the plurality of divided cores are integrally connected to each other.

13. The motor of claim 1, wherein a first gap is formed between the stator and the housing by the first groove, a second gap is formed between the stator and the housing by the second groove, wherein the first gap and the second gap are spaced apart from each other.

14. The motor of claim 1, wherein a friction area between the stator and the housing is reduced by the first groove and the second groove, thereby reducing friction torque.

15. A motor, comprising:
a housing;
a stator disposed in the housing; and
a rotor disposed in the stator and including a central axis, wherein the stator includes a plurality of divided cores, at least one of the plurality of divided cores including a head and a tooth connected to the head, wherein the head includes a first outer circumferential surface spaced apart from the housing and a second outer circumferential surface contacting the housing, the second outer circumferential surface extending from a first end of the second outer circumferential surface to a second end of the second outer circumferential surface, wherein the first outer circumferential surface includes a first groove, and wherein the second outer circumferential surface includes a second groove spaced apart from the first groove, the second groove provided on the second outer circumferential surface between the first end and the second end, the second outer circumferential surface is in contact with the housing at a first area of the second outer circumferential surface between the first end and the second groove, and is in contact with the housing at a second area of the second outer circumferential surface between the second groove and the second end.

16. The motor of claim 15, wherein the first groove and the second groove extend axially from an upper end to a lower end of the stator, wherein the first outer circumferential surface and the second outer circumferential surface include a curved surface shape disposed on a concentric circle having the central axis as a center.

17. The motor of claim 15, wherein a friction area between the stator and the housing is reduced by the first groove and the second groove, thereby reducing friction torque.

18. A motor, comprising:
a housing;
a stator disposed in the housing; and
a rotor disposed in the stator and including a central axis, wherein the stator includes a plurality of divided cores, at least one of the plurality of divided cores including a head and a tooth connected to the head, wherein the head includes a first outer circumferential surface including a first groove and a second outer circumferential surface including a second groove, the second outer circumferential surface extending from a first point at a first end of the second outer circumferential surface to a second point at a second end of the second outer circumferential surface, the first point of the second outer circumferential surface contacts the housing, the second point of the second outer circumferential surface contacts the housing, and the second groove is provided on the second outer circumferential surface between the first point and the second point, wherein the first outer circumferential surface and the second outer circumferential surface include curved surfaces having a same center, wherein the first outer circumferential surface having a first shortest distance from the central axis and the second outer circumferential surface having a second shortest distance from the central axis, wherein the first shortest distance is less than the second shortest distance, wherein the first groove is spaced apart from the second groove, and wherein an opening in the radial direction of the first groove is closer to the central axis than an opening in the radial direction of the second groove.

19. The motor of claim 18, wherein the first groove and the second groove extend axially from an upper end to a lower end of the stator,
wherein the first outer circumferential surface and the second outer circumferential surface include a curved surface shape disposed on a concentric circle having the central axis as a center.

20. The motor of claim 19, wherein the second outer circumferential surface is in contact with the housing at a first area between the first point and the second groove and is in contact with the housing at a second area between the second groove and the second point, and the first outer circumferential surface is spaced from the housing.

* * * * *